United States Patent Office 2,780,524
Patented Feb. 5, 1957

2,780,524

PROCESS FOR PRODUCTION OF SUBSTANTIALLY PHOSPHATE-FREE AMMONIUM SILICOFLUORIDE FROM DEN GAS

Gunter H. Gloss, Libertyville, and John H. Gross, Mundelein, Ill., assignors to International Minerals & Chemical Corporation, a corporation of New York No Drawing. Application December 17, 1953, Serial No. 398,867

5 Claims. (Cl. 23—88)

The instant invention relates to processes for the absorption of silicon tetrafluoride from gases containing it. More particularly, it relates to processes for the absorption and purification of the den gases evolved during the acidulation of phosphate rock with sulfuric acid and containing silicon tetrafluoride in the presence of phosphate impurities.

Fluorine-containing compounds, such as ammonium fluosilicate, ammonium fluoride, ammonium bifluoride and other metallic fluorides are prepared in processes involving the absorption of silicon tetrafluoride in water or in dilute ammonia to obtain either a solution containing fluosilicic acid or a solution containing ammonium fluosilicate. This solution can be reacted with a reagent, such as ammonia to obtain a solution containing ammonium fluoride.

An economical raw material for the production of ammonium fluoride and other fluorides is den gas. By the term "den gas" is meant the gas evolved when phosphate rock, apatite, bones or other phosphatic material containing fluorine compounds are decomposed with sulfuric acid or other acids in the process of making phosphoric acid or superphosphates. This den gas contains silicon tetrafluoride, which is absorbed in water to form fluosilicic acid and reacted with ammonia to produce the ammonium fluoride.

The den gases generally also contain entrained phosphate rock dust, and this phosphate is taken up in the silicon tetrafluoride absorption solution and will react with the fluosilicic acid to form insoluble calcium fluoride and phosphoric acid. The latter will remain in solution during any subsequent reactions, for example with ammonia, thereby contaminating the ammonium fluoride and other products.

It is an object of the instant invention to provide methods for purification of den gases.

It is a further object of the instant invention to provide methods for the removal of phosphatic impurities from den gases.

It is a further object of the instant invention to provide a process for the production of derivatives of fluosilicic acid, which are substantially free from phosphatic impurities.

It is a further object of the instant invention to provide a process for the production of ammonium fluoride which is substantially free of phosphatic impurities.

These and other objects of the instant invention will become more apparent as hereinafter described.

It has been discovered that the solubility and rate of solution of phosphate rock dust in aqueous silicon tetrafluoride absorption solutions is dependent upon the pH and temperature of the absorption solution. When silicon tetrafluoride is absorbed in water, the phosphate rock is readily soluble. The instant invention involves absorbing silicon tetrafluoride from gases which also contain phosphatic impurities in aqueous solutions having a pH between about 3.5 and about 5.5. For example, silicon tetrafluoride in den gases is absorbed in water to which sufficient ammonia has been added to maintain a pH between about 3.5 and about 5.5 in the resulting absorption solution, and by holding the temperature of said resulting solution below about 40° C.

The solubility of the tricalcium phosphate particles in the absorption solution increases as the temperature increases. The reaction occurring during the absorption is exothermic, and for this reason the absorbing solution should be cooled, so that the temperature is maintained at between about the freezing point of the solution and about 40° C., preferably between about 5° C. and about 25° C.

When ammonia is added to the water employed for the absorption of the silicon tetrafluoride, the solubility of the phosphate in the absorption solution decreases with increasing pH's between about 2.0 and about 5.5 A minimum in phosphate solubility occurs at a pH of about 4.5. At pH's in the absorption solution higher than at 5.5, the solubility of the phosphate increases rapidly. The time factor in this reaction also is to be considered. The retention time of the slurry in the absorber should not exceed about 8 hours, because if the retention time is substantially longer than this, the phosphate content of the absorption solution increases at all pH levels.

In one embodiment of the instant invention, den gas containing silicon tetrafluoride in the presence of phosphatic impurities is passed through an aqueous solution containing sufficient ammonia to maintain the pH of the resulting absorption solution between about 3.5 and about 5.5, preferably close to about 4.5. The temperature of the absorption solution is maintained at between about its freezing point and about 40° C., preferably between about 5° C. and about 25° C. The undissolved phosphate is not allowed to remain in contact with the solution for a period of time exceeding about 8 hours. The undissolved phosphate rock and any precipitated silica are separated from the resulting absorption solution, for example by filtration or by centrifuging. The resulting aqueous solution is then used in the production of ammonium fluosilicate, ammonium fluoride, ammonium bifluoride, or other metallic fluorides.

In a more specific embodiment of the instant invention, den gases are passed through an aqueous solution in a conventional apparatus employed for absorption of gases into liquids, such as a one- or two-stage jet absorber or tower. The absorption solution is prepared by continuously injecting sufficient aqueous or anhydrous ammonia to maintain a pH between about 3.5 and about 5.5. A slurry containing ammonium fluoride and ammonium fluosilicate in the aqueous phase and silica and suspended phosphate is continuously withdrawn from the absorber. During the absorption, the solution is cooled by any convenient means, such as inserted cooling coils, or a cooling jacket, to maintain the temperature between about the freezing point and about 40° C., preferably between about 5° C. and about 25° C. The insoluble material is separated from the solution, for example by filtration, prior to complete conversion of the aqueous phase to ammonium fluoride.

This solution produced by absorbing the silicon tetrafluoride from den gases in accordance with the above procedure is used to prepare a variety of derivatives, such as ammonium fluosilicate, ammonium fluoride, ammonium bifluoride, alkali metal fluorides and other metallic fluorides. For example, when ammonium fluoride or ammonium bifluoride is to be prepared from said solution, the solution containing ammonium fluosilicate and ammonium fluoride is treated with additional ammonia, for example as described and claimed in co-pending application, Serial No. 398,866, filed December 17, 1953, by Gunter H. Gloss and John H. Gross. In this process the absorption solution is added to an aqueous solution containing sufficient ammonia to maintain a pH above about 7.5 in the resulting solution, while its temperature is maintained below about 40° C. Silica which precipitates is separated, for example by filtration or settling from the ammonium fluoride solution. Ammonium bifluoride can be prepared from this ammonium fluoride solution by heating.

The following examples are presented in order to afford a clearer understanding of the practice of the instant invention, but it is understood that they are illustrative only and there is no intention to limit the invention thereto.

EXAMPLE I

The solubility principles upon which the instant invention is based were illustrated by preparing five solutions containing fluosilicic acid and phosphate rock and determining the solubility of the phosphate in each solution at various pH's. Sufficient 29% aqueous solution of ammonia was added to each of five 100 milliliter portions of about 18% aqueous fluosilicic acid to adjust the pH of the portions to the values 3, 4, 5, 6, and 7, respectively. About 10 grams of phosphate rock (34.05% $P_2O_5$) were then added to each portion of partially neutralized fluosilicic acid, and the resultant mixtures were stoppered and agitated at about 25° C. After about 2 hours, an aliquot of each mixture was withdrawn, and solids were separated by filtration. The liquid phase was analyzed. Table I shows the amount of phosphate dissolved in solutions at various pH's.

Table I

SOLUBILITY OF PHOSPHATE AT VARIOUS pH's

| pH: | $P_2O_5$, grams/liter |
|---|---|
| 3 | 1.84 |
| 4 | 0.06 |
| 5 | 1.08 |
| 6 | 0.60 |
| 7 | 10.26 |

The corresponding analysis for a similar mixture to which no ammonia was added was 33.89 grams $P_2O_5$/liter.

EXAMPLE II

The remaining portions of each of the five solutions prepared in Example I were stirred a total of 5 hours. An aliquot of each solution was withdrawn, and solids were separated by filtration. The $P_2O_5$ content of the liquid phase was determined for each. The remainder of the solution was allowed to stand about 24 hours before solids were separated and the $P_2O_5$ content of the solution was determined. Table II shows the $P_2O_5$ content of the solutions at the various pH's after a retention time of about 5 hours and about 24 hours. The increase in solubility of phosphate when prolonged retention time is employed is shown by the data in Table II.

Table II

SOLUBILITY OF PHOSPHATE FOR VARIOUS REACTION TIMES

| pH | $P_2O_5$, grams/liter | |
|---|---|---|
| | 5 hours | 24 hours |
| 3 | 1.10 | 1.96 |
| 4 | 0.45 | 1.16 |
| 5 | 0.60 | 1.21 |
| 6 | 12.61 | 21.54 |
| 7 | 14.18 | 18.54 |

Table II also shows that the solubility of $P_2O_5$ is at a minimum at pH's of between about 4.0 and about 5.0.

EXAMPLE III

The procedure described in Example I was repeated for a mixture which was adjusted to a pH of about 4.0 and stirred at about 50° C., instead of at about 25° C. Solids were separated by filtration, and the liquid phase was analyzed. This solution, which had been maintained at about 50° C., contained about 1.45 grams $P_2O_5$/liter of solution. The solution maintained at the same pH at about 25° C. contained only about .06 gram $P_2O_5$/liter.

Having thus fully described and illustrated the character of the instant invention, what is desired to be claimed and protected by Letters Patent is:

1. A process for the production of a substantially phosphate-free ammonium silicofluoride aqueous solution from a gas containing silicon tetrafluoride and phosphate material which comprises passing said gas through an aqueous absorption medium selected from the group consisting of water and an aqueous ammonium silicofluoride solution at a temperature between about the freezing point of the medium and about 40° F., while adding sufficient ammonia to the said absorption medium to maintain a pH of the reaction mixture of between about 3.5 and about 5.5 to dissolve silicon tetrafluoride from the gas and to leave the phosphate material substantially undissolved, and separating the substantially undissolved phosphate material from the substantially phosphate-free aqueous solution of ammonium silicofluoride.

2. The process of claim 1 in which the pH of the aqueous absorption medium is maintained between about 4.0 and about 5.0.

3. The process of claim 1 in which the temperature of the aqueous absorption medium is maintained between about 5° C. and about 25° C.

4. The process of claim 1 in which the pH of the aqueous absorption medium is maintained between about 4.0 and about 5.0.

5. A process for the production of a substantially phosphate-free aqueous solution of fluorides of ammonia from a gas containing silicon tetrafluoride and phosphate material which comprises passing said gas through an aqueous absorption medium selected from the group consisting of water and an aqueous ammonium silicofluoride solution at a temperature between about the freezing point of the medium and about 40° C., while adding sufficient ammonia to the said absorption medium to maintain a pH of the reaction mixture of between about 3.5 and about 5.5 to dissolve silicon tetrafluoride from the gas and to leave phosphate material substantially undissolved, separating the undissolved phosphate material from the substantially phosphate-free aqueous solution of ammonium silicofluoride, reacting the said solution of ammonium silicofluoride with additional ammonia to obtain ammonium fluoride in solution, and separating insoluble solids from the resulting ammonium fluoride-containing aqueous solution.

References Cited in the file of this patent

UNITED STATES PATENTS

| | | |
|---|---|---|
| 1,235,552 | Chappell | Aug. 7, 1917 |
| 1,642,896 | Sander | Sept. 20, 1927 |
| 2,385,208 | Jones | Sept. 18, 1945 |
| 2,447,359 | Oakley | Aug. 17, 1948 |
| 2,636,806 | Winter | Apr. 28, 1953 |

OTHER REFERENCES

J. W. Mellor's "A Comprehensive Treatise on Inorganic and Theoretical Chemistry," vol. 6 pages 945 and 949, Longmans, Green and Co., N. Y.